L. HENLE.
DAY AND NIGHT GLASS.
APPLICATION FILED JAN. 2, 1907.
1,042,346.
Patented Oct. 22, 1912.
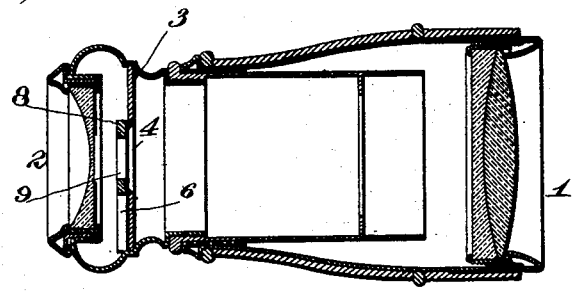
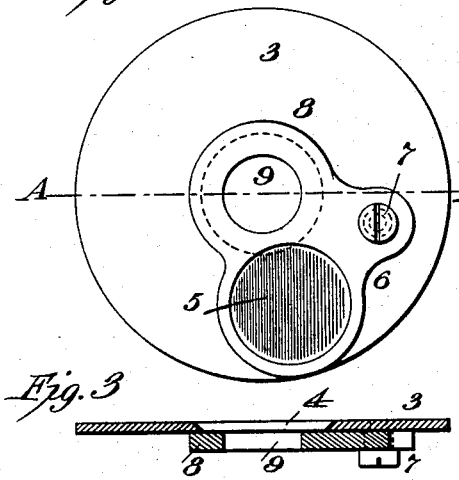
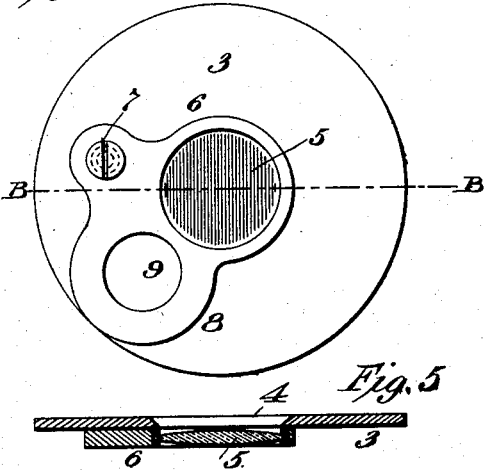
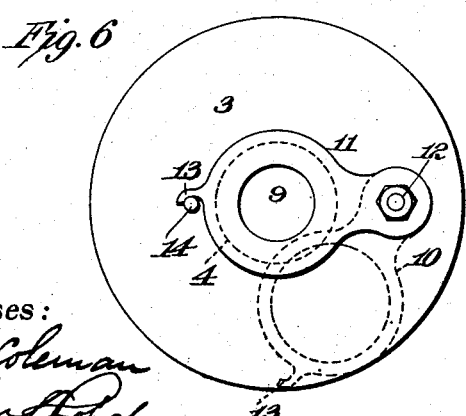
Witnesses:
Jas. F. Coleman
John Porch
Inventor
Leo Henle
By Dyer & Dyer
Attorneys.

UNITED STATES PATENT OFFICE.

LEO HENLE, OF NEW YORK, N. Y.

DAY AND NIGHT GLASS.

1,042,346. Specification of Letters Patent. Patented Oct. 22, 1912.

Application filed January 2, 1907. Serial No. 350,497.

*To all whom it may concern:*

Be it known that I, LEO HENLE, a citizen of the United States of America, residing in the borough of Manhattan, in the city, county, and State of New York, have invented Improvements in Day and Night Glasses, of which the following is a specification.

The object I have in view is the production of a new and improved and easily convertible day and night glass in which, when used as a day glass, the magnification is high and the aperture of the diaphragm is small, and when used as a night glass, the magnification is lower and a diaphragm with larger aperture is employed.

Further objects will more fully appear by means of the structures illustrated in the accompanying drawings and specification.

Figure 1 is a longitudinal section of a glass embodying my invention, Fig. 2 is an enlarged view of the diaphragm adjacent to the eye-piece when arranged for day use, Fig. 3 is a section on the line A—A, Fig. 2, Fig. 4 is a view similar to Fig. 2, but showing the parts arranged when the glass is used for night. Fig. 5 is a sectional view on the line B—B of Fig. 4. Fig. 6 is a side view of a modification, and Fig. 7 an end view of the same.

In all the views like parts are designated by the same reference characters.

In carrying out my invention I provide an objective 1 and an eye-piece lens 2. Between the two lenses, and adjacent to the eye-piece lens is a diaphragm 3 having a diaphragm opening 4 therein. Interposed between the diaphragm 3 and the eye-piece lens is an auxiliary lens 5 which may be of double convex form and which serves to reduce the magnifying power of the glass. This lens is supported upon a frame 6 which is pivoted at 7. Upon the same frame 6 is an extension 8 having an auxiliary diaphragm with an opening 9. The frame 6 is so proportioned and its pivot is so arranged that when the glass is held in the position shown in Fig. 2, the center of the diaphragm opening 9 will exactly coincide with the center of the diaphragm opening 4, and when in the position shown in Fig. 4 the center of the lens 5 will exactly coincide with the center of the diaphragm opening 4. These positions are secured by turning the glass upside down, reversing the position of the pivot from one side to the other of the center. The edge of the frame 6 abutting against the inside of the barrel of the glass will determine the coincidence of the centers of the opening 9 and lens 5 with the opening 4. When arranged as a day glass, the frame 6 will be in the position shown in Fig. 2, so that the diaphragm openings 9 and 4 will coincide and that portion of the frame 6 which is provided with the opening 9 becomes the diaphragm and the diameter of the diaphragm aperture will be reduced to that of the opening 9. When held in the position shown in Fig. 4, the lens 5 will be coincident with the center of the diaphragm opening 4 thus producing a night glass.

The diaphragm opening 4 is properly proportioned to be used with the glass when it is employed as a night glass, that is to say, it is sufficiently large to permit the maximum of useful rays of light to be transmitted from the objective 1 to the eye-piece lens 2. The diaphragm opening 9 is smaller than the diaphragm opening 4, so that when it is used with the higher magnification permitted by the day glass, certain of the outer light rays will be intercepted and the definition of the image improved. The lens 5 is for the purpose of reducing the effect of the concavity of the eye-piece lens 2 and thereby decreasing the magnification. This decrease in magnification will naturally result in a corresponding increase in field, and on account of the large diaphragm opening a great increase in luminosity of the image will result.

From the above description it will be seen that the glass will change from a day to a night glass by simply reversing its position, allowing the frame 6 to move the lens 5 or auxiliary opening 9 into proper position. When used as a day glass the magnifying power will be high and the diaphragm opening will be properly reduced to improve the definition of the image. When used as a night glass the magnifying power is decreased and the diaphragm opening will be properly increased, so that the necessary luminosity of the image will be secured.

The invention may be modified in numerous ways, the structure shown in Figs. 6 and 7 illustrating one modification. In this structure, the lens 5 and auxiliary diaphragm opening 9 appear upon separate frames 10 and 11. These frames are secured to a common pivot 12, their other extremities carrying hooks 13 which engage with a pin 14 extending through the diaphragm 3 so that the hooks on each side may engage with it. In this structure when held in the position shown in Fig. 6, the diaphragm opening 9 will coincide with the diaphragm opening 4, the lens 5 dropping away and leaving the path clear. By reversing the position of the parts the frame 10 will drop into position placing the lens 5 in coincidence with the opening 4 and dropping the frame 11 with the auxiliary diaphragm out of the way.

In accordance with the provisions of the patent statutes, I have described the principle of my invention, together with the apparatus which I now consider to represent the best embodiment thereof; but I wish it to be understood that I do not desire to be limited to the exact details of construction shown and described, for obvious modifications will occur to a person skilled in the art.

Having now described the nature of my invention and in what manner the same is to be performed, what I claim and desire to secure by Letters Patent is:—

In a day and night glass, an objective lens; an eye-piece lens; a fixed diaphragm; said diaphragm having an aperture therein of suitable size for night use; a frame, pivoted within the glass; said frame carrying an auxiliary lens, suitable to reduce the magnifying power of the glass; said frame also carrying an auxiliary diaphragm with an aperture, said aperture being smaller than the aperture in the fixed diaphragm, for decreasing the effective size of such aperture; the frame turning upon its pivot, as the glass is turned with one or the other side up; and means to aline the frame with the auxiliary diaphragm aperture, or the auxiliary lens, coincident with the fixed lenses, as depends upon the position of the glass.

This specification signed and witnessed this thirty first day of December, 1906.

LEO HENLE.

Witnesses:
 JNO. ROB'T TAYLOR,
 JOHN L. LOTSCH.

---

Copies of this patent may be obtained for five cents each, by addressing the "Commissioner of Patents, Washington, D. C."